US005364322A

United States Patent [19]

Fukui

[11] Patent Number: 5,364,322

[45] Date of Patent: Nov. 15, 1994

[54] CONTROL APPARATUS FOR A MARINE ENGINE

[75] Inventor: Wataru Fukui, Himeji, Japan

[73] Assignee: Mitsubishi Denki Kabushiki Kaisha, Tokyo, Japan

[21] Appl. No.: 167,348

[22] Filed: Dec. 15, 1993

Related U.S. Application Data

[62] Division of Ser. No. 870,913, Apr. 20, 1992.

[30] Foreign Application Priority Data

Apr. 22, 1991 [JP] Japan .................................... 3-90320
Apr. 22, 1991 [JP] Japan .................................... 3-90321
Apr. 25, 1991 [JP] Japan .................................... 3-95195

[51] Int. Cl.[5] .............................................. F16H 59/74
[52] U.S. Cl. ...................................................... 477/108
[58] Field of Search ......................... 477/108, 110, 111

[56] References Cited

U.S. PATENT DOCUMENTS 3,020,777 2/1962 Burkett ................................ 477/108
4,972,737 11/1990 Makimoto ........................... 477/108
5,172,666 12/1992 Nonaka ............................... 123/352
5,184,589 2/1993 Nonaka ............................... 123/352
5,241,939 9/1993 Nonaka ............................... 123/492

FOREIGN PATENT DOCUMENTS 61-171697 8/1986 Japan .................................. 477/108

*Primary Examiner*—Dirk Wright
*Attorney, Agent, or Firm*—Sughrue, Mion, Zinn, Macpeak & Seas

[57] ABSTRACT

A control apparatus for a marine engine capable of effectively suppressing a great variation in the rotational speed of the engine due to a great variation in an intake air pressure particularly when the engine is trolling. In one form, an air/fuel ratio of a mixture supplied to the engine is made constant to maintain engine output power at a constant level. In another form, the intake air pressure, based on which the engine is controlled, is averaged in such a manner as to reduce a variation in the engine rotational speed by using a greater averaging coefficient during trolling than at other times. In a further form, if a variation in the intake air pressure is less than a predetermined value, the intake air pressure is used controlling the engine, whereas if otherwise, another engine operating parameter such as an opening degree of a throttle valve is used instead of the intake air pressure.

6 Claims, 6 Drawing Sheets

CONTROL APPARATUS FOR A MARINE ENGINE

This is a division of application Ser. No. 870,913 filed Apr. 20, 1992, now allowed.

BACKGROUND OF THE INVENTION

The present invention relates to a control apparatus for controlling the operation of a marine engine. More particularly, it relates to such an engine control apparatus which is effective to suppress variations in the output power of the engine when a boat having the engine mounted thereon is trolling.

FIG. 7 schematically illustrates a typical example of an outboard marine engine 1 mounted on a boat 3 at a location outside a boat hull *3a* In this figure, the engine 1 in the form of an internal combustion engine for outboard use is disposed outside the boat hull *3a* at the stern thereof and mounted to the boat hull *3a* through a mounting member la. A propulsion screw 2 is disposed under water and operatively connected with the engine 1 so that it is thereby driven to rotate.

FIG. 8 shows in block form the general construction of a conventional engine control apparatus for controlling the outboard engine 1 of FIG. 7. In this figure, a rotational speed sensor 4 is mounted on a camshaft or crankshaft (not illustrated) of the engine 1 so that it generates a crank signal representative of a reference crankshaft position in synchronization with the rotation of the unillustrated crankshaft for sensing the rotational speed or the number of revolutions per minutes of the engine 1 and generating a corresponding output signal R. A throttle sensor 5 senses the throttle opening or the degree of opening of a throttle valve (not shown) of the engine 1 corresponding to the quantity of depression of an unillustrated accelerator pedal of the engine 1 by an operator, and generates a corresponding throttle signal a. A gear position sensor 8 senses the gear position of a transmission (not shown) of the engine 1 and generates a corresponding gear position signal G. A controller 6 receives output signals from various sensors indicative of various engine operating conditions including the output signals R, a, G of the rotational speed sensor 4, the throttle sensor 5 and the gear position sensor 8, and generates a drive signal A for controlling various engine control parameters on the basis of these output signals. An actuator means 7 is operatively connected to the controller 6 so that it is driven to operate by means of the drive signal A from the controller 6. The actuator means 7 controls various driving and control elements or devices such as a fuel pump, an ignition coil, a throttle actuator, a starter motor and the like associated with the engine 1.

Next, the operation of the above-described conventional engine control apparatus will be described in detail while referring to FIGS. 7 and 8. First, the controller 6 generates a drive signal A based on the output signals from the various sensors including the rotational speed signal R, the throttle signal $\alpha$, the gear position signal G, the reference crank signal and the like representative of various engine operating conditions, for controlling the actuator means 7 (e.g., for controlling a fuel pump, an ignition coil, a throttle valve, etc.) as well as calculating and controlling operational timings thereof such as fuel supply or injection timing, ignition timing, etc.

Here, it should be noted that in the case of the marine engine 1, the boat should be caused to travel at a low speed during trolling. However, since in this case, the engine 1 is controlled in a feedback manner so as to make the air/fuel ratio of the mixture to be at a stoichiometric value (i.e., 14.7), as in the case of cruising, engine hunting often results, causing substantial variations in the travelling speed of the boat 3 and resultant discomfort to the passengers therein.

In addition, the controller 6 receives an output signal from an unillustrated pressure senor which senses an intake manifold pressure or an intake air pressure representative of an engine load, and averages it with a predetermined averaging coefficient to provide an averaged value which is regarded as the engine load at that time. Based on the thus averaged intake manifold pressure, the controller 6 properly adjusts engine control parameters. That is, the pressure of intake air in an intake manifold normally varies with high frequencies on each intake stroke of each cylinder, so averaging of the intake manifold pressure is required to stabilize its value in order to utilize it for engine control.

In this case, during trolling in which the boat 3 is caused to travel in a low speed, the period of a pulsating component of the intake manifold pressure tends to become longer with respect to the averaging coefficient, so usual averaging becomes insufficient. As a result, the pulsating component reflected on the engine control parameters to cause variations in the rotational speed of the engine, thus substantially impairing riding comfort.

SUMMARY OF THE INVENTION

Accordingly, the present invention is aimed at overcoming the above-described problems of the conventional marine engine control apparatus.

Thus, it is an object of the invention to provide a novel and improved control apparatus for a marine engine which is able to control the output power of the engine at a constant value when the boat is trolling, thereby improving riding comfort.

Another object of the invention is to provide a novel and improved control apparatus for a marine engine which is able to control the engine on the basis of various engine operating conditions other than an intake air pressure to suppress variations in the rotational speed of the engine when there is a great variation in the intake air pressure.

In order to achieve the above objects, according to one aspect of the invention, there is provided a control apparatus for a marine engine having a transmission comprising: a rotational speed sensor for sensing the number of revolutions per minute of the engine and generating a corresponding output signal; a gear position sensor for sensing a gear position of the transmission and generating a corresponding output signal; an air/fuel ratio sensor for sensing an air/fuel ratio of a mixture supplied to the engine and generating a corresponding output signal; a controller connected to receive the output signals from the rotational speed sensor, the gear position sensor and the air/fuel ratio sensor for generating a drive signal which controls an engine control parameter, based on at least the number of revolutions per minute of the engine, the gear position and the air/fuel ratio as sensed by the sensors; and actuator means connected to receive the drive signal from the controller for controlling the engine control parameter based on the drive signal. The controller comprises: a trolling determinor for determining, based on the number of revolutions per minute of the engine and the gear position, whether the engine is trolling; and power control means for controlling the actuator means such that output power of the engine is made to be at a constant value when the engine is trolling.

The controller is operable to control the actuator means such that the air/fuel ratio of the mixture is made to be at a stoichiometric value when the engine is not trolling, but the amount of fuel supply to the engine is made to be at a constant value when the engine is trolling.

According to another aspect of the invention, there is provided a control apparatus for a marine engine having a transmission comprising: a rotational speed sensor for sensing the number of revolutions per minute of the engine and generating a corresponding output signal; a gear position sensor for sensing a gear position of the transmission and generating a corresponding output signal; a pressure sensor for sensing an intake air pressure in an intake manifold of the engine and generating a corresponding output signal; a controller connected to receive the output signals from the rotational speed sensor, the gear position sensor and the pressure sensor for generating a drive signal which controls engine control parameters, based on at least the number of revolutions per minute of the engine, the gear position and the intake air pressure as sensed by the sensors; actuator means connected to receive the drive signal from the controller for controlling the engine control parameters based on the drive signal. The controller comprises: a trolling determinor for determining, based on the number of revolutions per minute of the engine and the gear position, whether the engine is trolling; and pressure stabilizing means for controlling the actuator means in such a manner as to increase output power of the engine in accordance with the increasing intake air pressure. The pressure stabilizing means is operable to control the actuator means based on an averaged value of the intake air pressure which is obtained by using a greater averaging coefficient when the engine is trolling than in other operating states of the engine so as to reduce a variation in the averaged intake air pressure.

In one form, the averaging of the intake air pressure sensed by the pressure sensor is performed as follows:

$$P_R = P/m + P_{R-1}(m-1)/m$$

where P is a current intake air pressure sensed by the pressure sensor; $P_R$ is a current average of the intake air pressure; $P_{R-1}$=a previous average of the intake air pressure; and m is the averaging coefficient.

According to a further aspect of the invention, there is provided a control apparatus for a marine engine comprising: a first sensor for sensing an intake air pressure in an intake manifold of the engine and generating a corresponding output, signal; a second sensor for sensing an engine operating condition indicative of an engine load other than the intake air pressure and generating a corresponding output signal; a controller connected to receive the output signals from the first and second sensors for generating a drive signal based on the these signals; and actuator means connected to receive the drive signal from the controller for controlling engine control parameters. The controller is operable to control the actuator means based on the intake air pressure sensed by the first sensor when a variation in the intake air pressure is less than a predetermined value, but based on the engine operating condition sensed by the second sensor when the intake air pressure variation is equal to or greater than the predetermined value.

Preferably, the second sensor comprises a throttle sensor for sensing an opening degree of a throttle valve of the engine and generating a corresponding output signal.

The above and other objects, features and advantages of the invention will become apparent from the ensuing detailed description of the invention taken in conjunction with the accompanying drawings.

DESCRIPTION OF THE PREFERRED EMBODIMENT

Preferred embodiments of the invention will now be described in detail with reference to the accompanying drawings.

Figure 1:
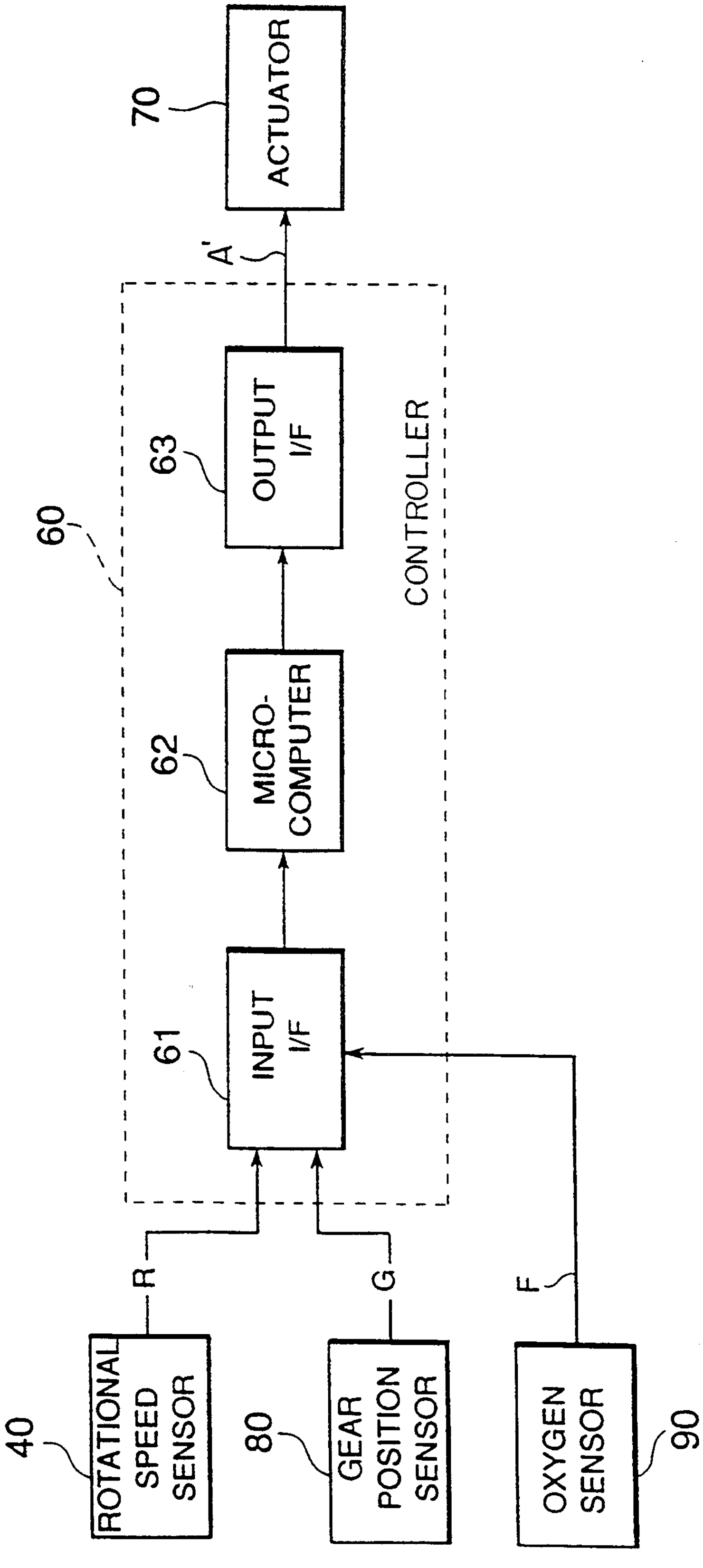
FIG. 1 is a block diagram of a control apparatus for a marine engine in accordance with a first embodiment of the present invention.
Figure 8:
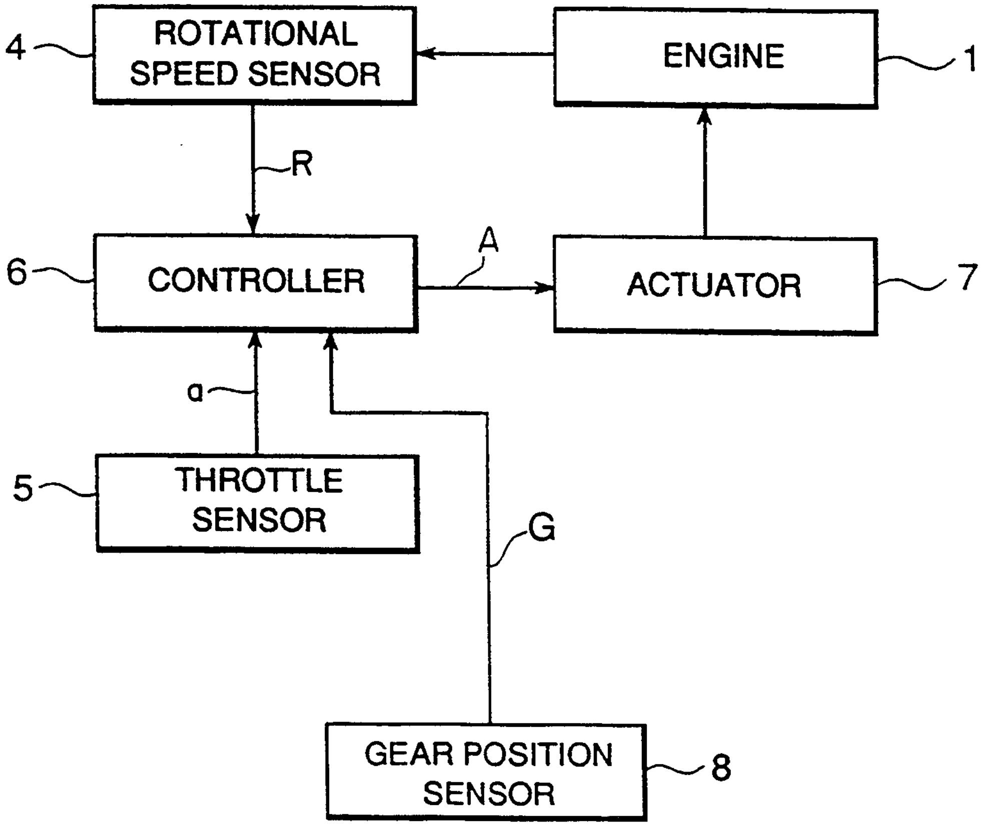
FIG. 8 PRIOR ART
FIG. 8 is a block diagram of a conventional engine control apparatus for an outboard marine engine.

FIG. 1 shows in block form the general arrangement of an engine control apparatus for controlling the operation of a marine engine constructed in accordance with a first embodiment of the present invention. In this figure, the apparatus illustrated includes, in addition to a rotational speed sensor 40, an actuator means 70 and a gear position sensor 80 all of which are similar to the corresponding elements 4, 7 and 8, respectively, of FIG. 8, an oxygen sensor 90 for sensing an amount of oxygen (or oxygen content) contained in the engine exhaust representative of the air/fuel ratio of a mixture supplied to the marine engine 1 (see FIG. 5) and generating a corresponding oxygen signal, and a controller 60 for controlling the actuator means 70 on the basis of the output signals from the sensors 40, 80 and 90 as well as other signals from unillustrated sensors representative of various engine operating conditions.

The controller 60 comprises an input interface 61 to which various signals inclusive of a rotational speed signal R from the rotational speed sensor 40, a gear position signal G from the gear position sensor 80 and an oxygen signal F from the oxygen sensor 90 as well as other signals representative of various engine operating conditions are input, a microcomputer 62 for performing computations and determinations on the basis of various input signals supplied to the input interface 61 and generating a drive signal A' for controlling and driving the actuator means 70, and an output interface 63 for outputting the drive signal A' generated by the microcomputer 62 to the actuator means 70.

The oxygen sensor 90 senses the amount or content of oxygen contained in the exhaust gases discharged from the engine I and generates a corresponding oxygen signal F to the input interface 61 of the controller 60. In general, the amount or content of oxygen in the engine exhaust is in proportion to the air/fuel ratio of a mixture supplied to the engine 1, so that it increases or decreases in accordance with the increasing or decreasing air/fuel ratio. Accordingly, the oxygen sensor 80 generates an oxygen signal F of a high level when it senses an oxygen amount or content corresponding to a lean mixture which has an air/fuel ratio greater than the stoichiometric air/fuel ratio (i.e., 14.7), whereas it generates an oxygen signal F of a low level when it senses an oxygen amount or content corresponding to a rich mixture which has an air/fuel ratio less than the stoichiometric air/fuel ratio.

The microcomputer 62 of the controller 60 includes a trolling determinor for determining, based on the rotational speed R (i.e., rpm) and the gear position G, whether a boat 3 (see FIG. 7) on which the engine 1 and the engine control apparatus of the invention are mounted is trolling, and a power control means for controlling the acuator means 70 such that output power of the engine 1 is made to be at a constant value when the boat 3 is trolling. For example, the power control means comprises a fuel control means for controlling an amount of fuel injected or supplied to the engine 1 based on an engine load (which is sensed by an unillustrated engine load sensor such as a pressure sensor for sensing an intake air pressure in an engine intake manifold) and the rotational speed of the engine i so as to make the engine output power at a constant value when the boat 3 is trolling. To this end, however, appropriate means other than the fuel control means can be employed such as an ignition control means which suitably controls, based on the engine load and the engine rotational speed, the ignition timing of the engine 1 in an advancing or retarding direction to thereby maintain the engine output power at a constant value.

Figure 2:
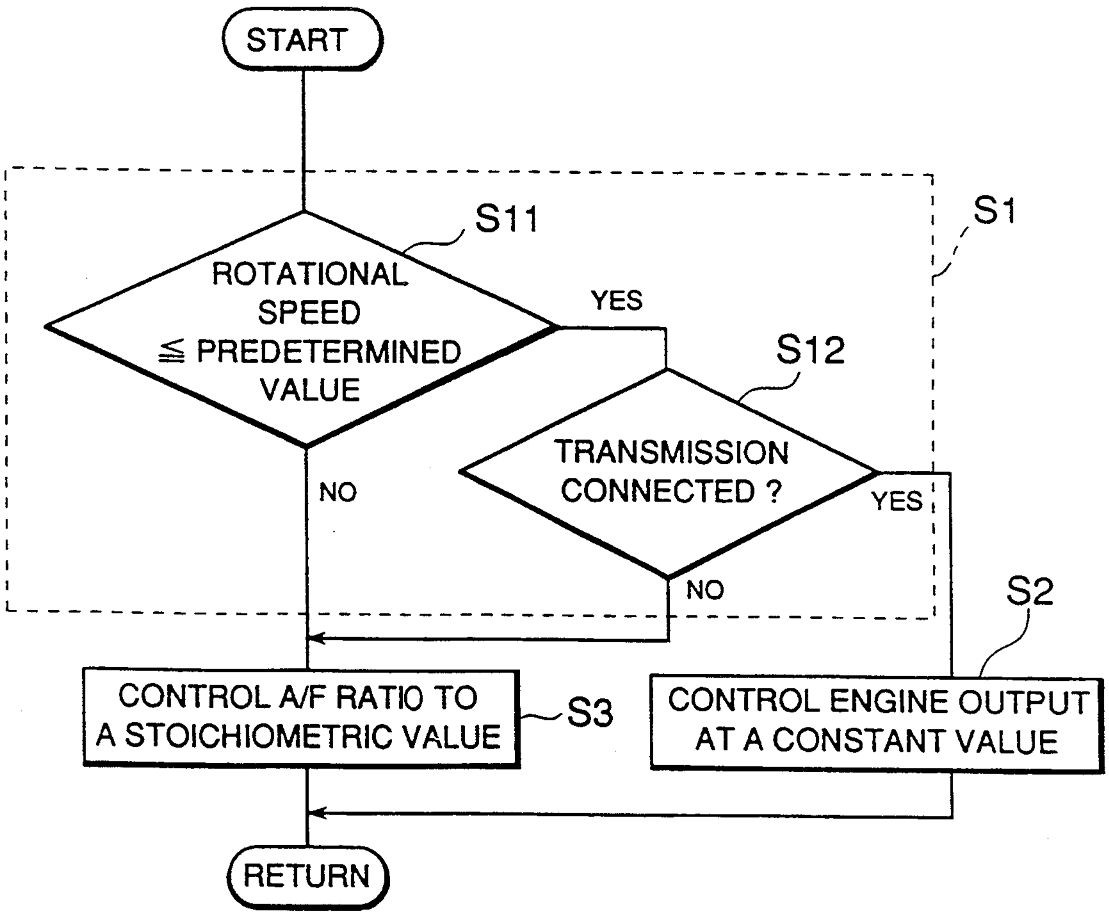
FIG. 2 is a flow chart showing an example of an engine control process of the invention performed by the apparatus of FIG. 1.
Figure 7:
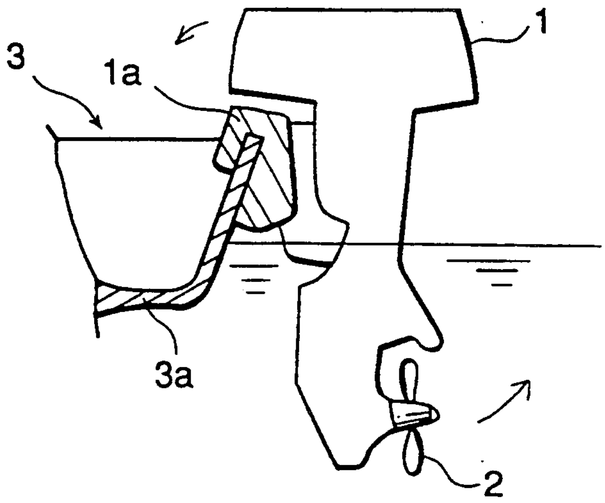
FIG. 7 is a schematic illustration showing the general construction of an outboard marine engine.

The operation of the above embodiment will now be described in detail while referring to the flow chart of FIG. 2 as well as FIG. 7. As shown in FIG. 2, first in Step S11, the microcomputer 62 determines, based on the output signal R from the rotational speed sensor 40, whether the rotational speed or the number of revolutions per minute of the engine 1 is equal to or less than a predetermined value. If the answer to this question is "YES", then in Step S12, the microcomputer 62 further determines, based on the output signal G from the gear position sensor 80, whether the gear position of an unillustrated transmission of the engine 1 is in a coupled state (i.e., not in a neutral state) in which the output power of the engine 1 is transmitted to the propulsion screw 2 through the transmission. If the answer to the question in Step S12 is "YES", it is determined that the boat 3 is trolling. Thus, Steps 11 and 12 constitute a trolling determining Step 1, generally designated by broken line in FIG. 2. In this case, the program goes to Step S2 where the microcomputer 62 generates a drive signal A' to the actuator means 70 for controlling the engine output power at the constant value. In the illustrated example, based on the drive signal A', the actuator means 70 controls an unillustrated fuel control means such as a fuel pump or injector so as to supply or inject into the engine 1 an amount of fuel which can be determined by looking up an unillustrated fuel amount map in which the amount of fuel to be supplied to the engine 1 is plotted as a function of the intake air pressure and the engine rotational speed. Thus, in this case, the air/fuel ratio as sensed by the oxygen sensor 90 is not fed back to or reflected on the controller 60 but instead it is maintained substantially constant, so the engine output power is thereby controlled to a constant level. This serves to suppress variations in the rotational speed of the engine 1 to thereby improve riding comfort.

On the other hand, if in Step S1 it is determined that the boat is not trolling [i.e., if the engine rotational speed or rpm is greater than the predetermined value (in Step 11), or if the gear position of the transmission is in a neutral state (in Step S12)], the program proceeds to Step S3 where the controller 62 performs the fuel supply or injection control in a feedback manner on the basis of the oxygen signal F from the oxygen sensor 90. Specifically, it is determined, on the basis of the oxygen signal F, whether the air/fuel ratio is lean or rich, and the microcomputer 62 controls the actuator means 70 so as to drive the unillustrated fuel pump or injector in the following manner. That is, if the air/fuel ratio is lean, the amount of fuel supply or injection is increased, and if it is rich, the amount of fuel supply or injection is decreased, so that the air/fuel ratio is made to be at the stoichiometric value (i.e., 14.7).

In this manner, the amount of fuel supply to the engine 1 is controlled on the basis of the oxygen signal F in a feedback manner to make the air/fuel ratio substantially equal to the stoichiometric value during normal operation (i.e., other than trolling) of the boat 3, whereas it is controlled to provide substantially constant output power of the engine 1 during trolling, thus suppressing variations in the engine rotational speed for improved riding comfort.

Although in the above embodiment, the fuel supply is controlled, in Step S2, for maintaining the engine output power at a constant level during trolling by determining the amount of fuel supply on the basis of the engine load and the engine rotational speed while looking up the fuel amount map, such control can be made, instead of using the fuel amount map, by presetting an amount of fuel to be supplied or injected into the engine 1 based solely on the engine rotational speed in the event that there is a great variation in the intake air pressure.

Figure 3:
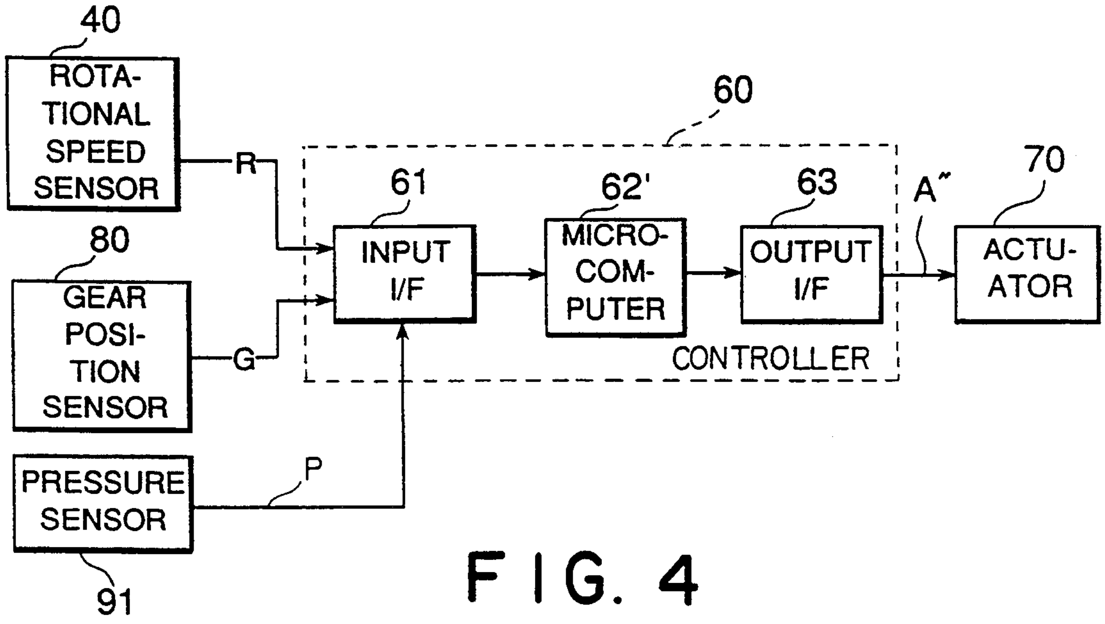
FIG. 3 is a view similar to FIG. 1, but showing a second embodiment of the invention.

FIG. 3 illustrates a second embodiment of the invention. In this figure, the apparatus of this embodiment is substantially similar to the previous embodiment of FIG. 1 except for the following features. Specifically, the oxygen sensor 90 of FIG. 1 is replaced by a pressure sensor 91 which senses tile pressure in an intake manifold of the engine 1 (FIG. 5) and generates a corresponding pressure signal P to a controller 60. Also, the controller 60 includes, in addition to an input interface 61 and an output interface 63 which are the same as those of FIG. 1, a microcomputer 62' which includes a trolling determinor for determining, based on a rotational speed signal R from the rotational speed sensor 40 and a gear position signal G from the gear position sensor 80, whether the boat is trolling, and a pressure stabilizing means for stabilizing an intake air pressure in an engine intake manifold by increasing an averaging coefficient during trolling of the boat. Specifically, the pressure stabilizing means is operable to control the actuator means 70 based on an averaged value of the intake air pressure which is obtained by using a greater averaging coefficient when the engine is trolling than in other operating states of the engine so as to reduce a variation in the averaged intake air pressure.

For example, the averaging of the intake air pressure is performed as follows:

$$P_R = P/m + P_{R-1}(m-1)/m \quad (1)$$

where P is the current intake air pressure sensed by the pressure sensor 91; $P_R$ is a current average of the intake air pressure; $P_{R-1}$ = a previous average of the intake air pressure; and m is the averaging coefficient.

Figure 4:
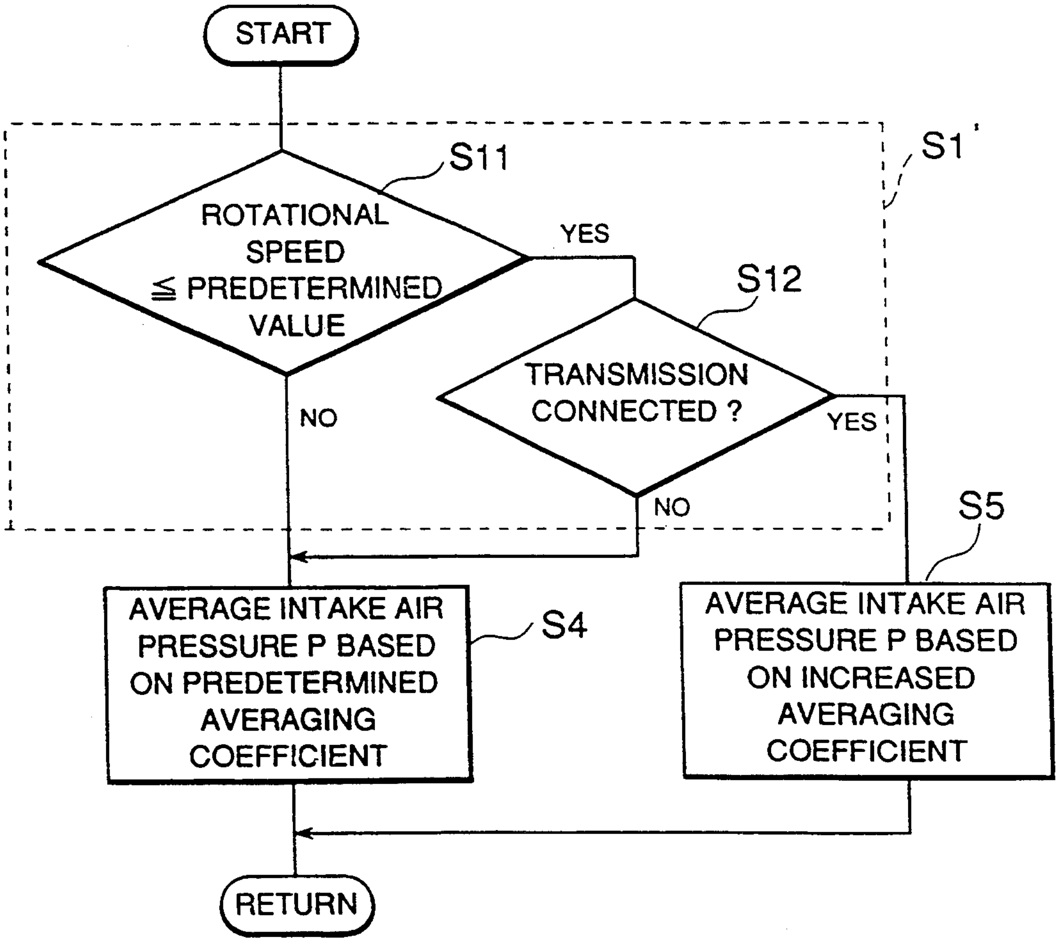
FIG. 4 is a view similar to FIG. 2, but showing an operating process of the second embodiment of FIG. 3.

The operation of this embodiment will be described in detail while referring to the flow chart of FIG. 4. In this figure, Step S1 comprising Steps S11 and S12 for trolling determination is the same as that in the flow chart of FIG. 1. If in Step S1 it is determined that the boat is not trolling, then in Step S4, the microcomputer 62' averages the intake air or manifold pressure P from the pressure sensor 91 on the basis of the predetermined averaging constant m to provide an averaged or stabilized value $P_R$, using equation (1) above. In this case, the averaging coefficient m is set to a small number such as 2 or 3 so that the current intake air pressure P has a greater influence on the averaged value $P_R$.

If, however, in Step S1 it is determined that the boat is trolling, then in Step S5, the microcomputer 62 averages the current intake air pressure P with an increased averaging coefficient m (e.g., 5 or more), which is greater than the one for trolling, using equation (1) above. Based on the thus stabilized or averaged intake air pressure $P_R$, the microcomputer 62' controls engine control parameters in a stable manner while substantially reducing influences from low-frequency pulsating components contained in the pressure signal P from the pressure sensor 91 during trolling of the boat.

In this manner, the pressure signal P from the pressure sensor 91 is stabilized by a standard averaging coefficient during normal travel of the boat (i.e., cruising operation or neutral state of the engine 1), but it is stabilized by an increased averaging coefficient greater than the standard one during trolling of the boat, which serves to suppress variations in the rotational speed of the engine 1, thereby providing comfortable ride.

Figure 5:
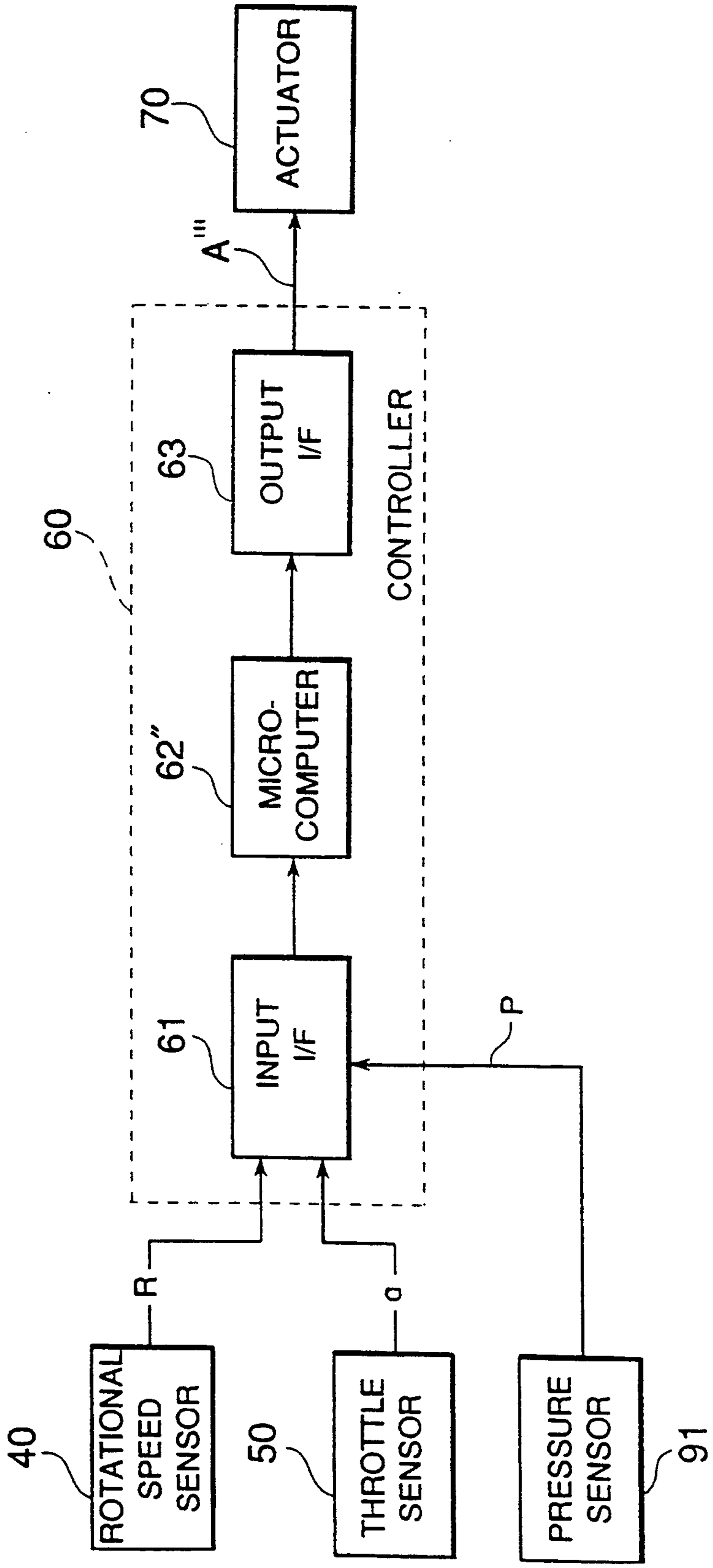
FIG. 5 is a view similar to FIG. 1, but showing a third embodiment of the invention.

FIG. 5 illustrates a third embodiment of the present invention which is substantially similar to the previously mentioned first embodiment of FIG. 1 except for the following. Namely, in this embodiment, the gear position senor 80 and the oxygen sensor 90 of FIG. 1 are omitted and not illustrated, but they may of course be employed. Instead, provision is made for a first sensor 91 in the form of a pressure sensor which senses an intake air pressure in an intake manifold of an engine and generates a corresponding output signal P, and a second sensor 50 for sensing an engine operating condition indicative of an engine load other than the intake air pressure and generating a corresponding output signal. For example, the second sensor 50 comprises a throttle sensor for sensing an opening degree of a throttle valve of the engine and generating a corresponding output signal $\alpha$. The controller 60 includes, in addition to an input interface 61 and an output interface 63 which are the same as those of FIG. 1, a microcomputer 63" which is different in operation from the microcomputer 63 of FIG. 1. The microcomputer 62" includes a first operational quantity determinor for determining an operational quantity for an engine control parameter based on the output signal of the pressure sensor 91 indicative of the intake air pressure P when a variation in the intake air pressure P is less than a predetermined value, so that the output power of the engine increases in accordance with the increasing engine load, and a second operational quantity determinor for determining an operational quantity for the engine control parameter based on the output signal of the second sensor indicative of the engine load such as the opening degree a of the throttle valve other than the intake air pressure P when a variation in the intake air pressure P is equal to or greater than the predetermined value.

Figure 6:
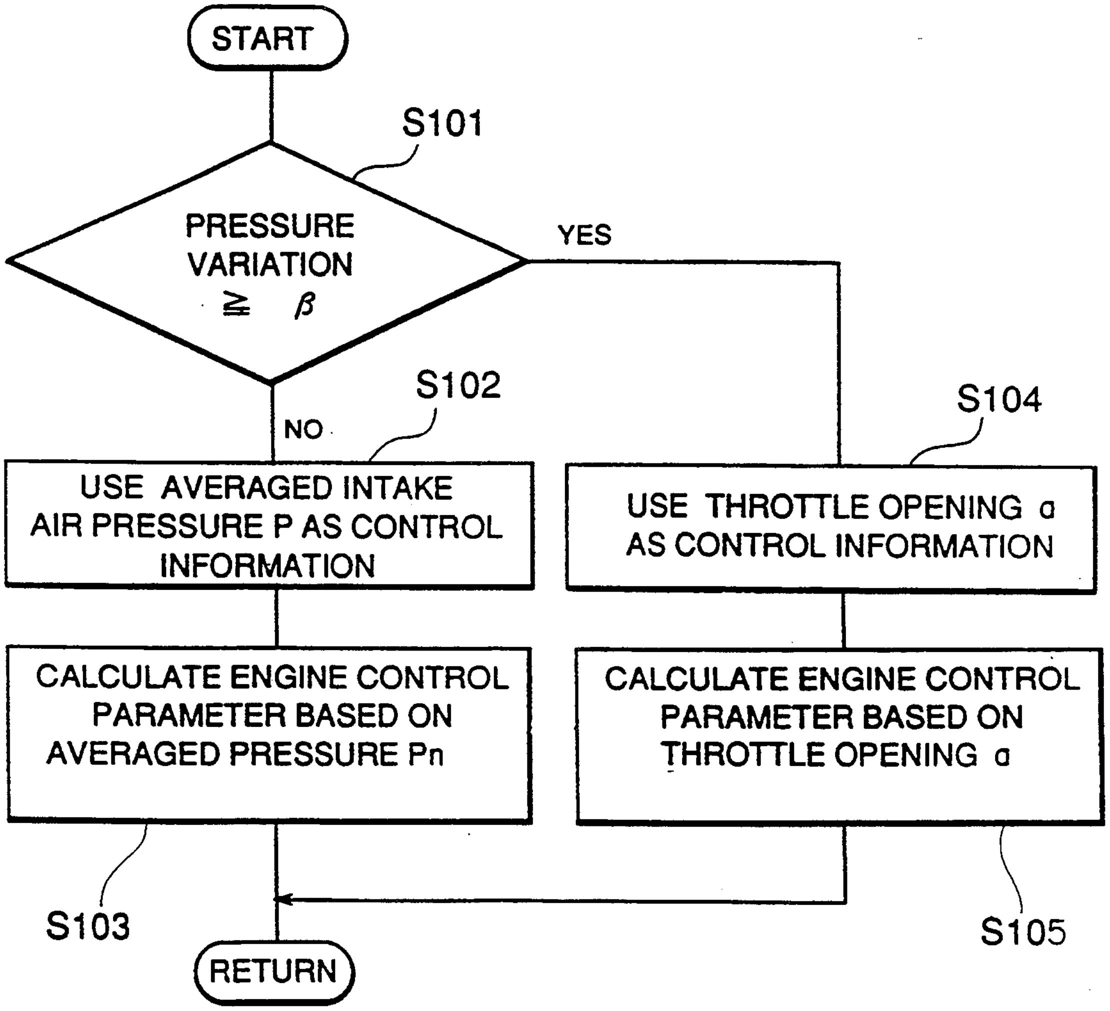
FIG. 6 is a view similar to FIG. 2, but showing an operating process of the third embodiment of FIG. 5.

Now, the operation of this embodiment will be described below while referring to the flow chart of FIG. 6 as well as FIG. 7. In FIG. 6 which shows the operational process or program executed by the microcomputer 62", first in Step S101, it is determined whether a variation (dP/dt) in the intake air or manifold pressure P is equal to or greater than a predetermined value $\beta$. If the answer to this question is "NO", then in Step S102, the intake air pressure P is averaged to provide an average pressure $P_R$, for example, using equation (1) above. Subsequently in Step S103, based on the average pressure $P_R$ thus obtained, an operational quantity for an engine control parameter such as an amount of fuel supply, ignition timing and the like for controlling the engine is calculated, and a corresponding drive signal A''' is generated.

On the other hand, if it is determined in Step S101 that the variation $\beta$ in the intake air pressure P is equal to or greater than the predetermined value $\beta$, such as during trolling of the boat, then the program goes to Step S104 where a signal such as a throttle signal a other than the pressure signal P is employed as a piece of control information. Thereafter in Step S103, on the basis of the control information in the form of the throttle opening $\alpha$, an operational quantity for a desired engine control parameter is calculated, and a corresponding drive signal A''' is generated.

By means of the drive signal A'' ' thus generated, the actuator means 70 controls an unillustrated engine control means such as a fuel injector, an ignition coil or the like of the engine.

In this connection, it is to be noted that although the intake air or manifold pressure P is most suitable for a piece of information representative of the engine load, the throttle opening $\alpha$ can be used for this purpose in the event that the intake air pressure P varies greatly and hence becomes unsuitable to this end. In this case, the drive signal A'' ' is substantially free from any adverse influences due to great pulsating components contained in the intake air pressure P, and it is able to drive the actuator means 70 in a most stable manner. Thus, a control quantity of the actuator means 70 driven by the drive signal A''' becomes suitable for suppressing substantial variations in the engine rotational speed during trolling of the boat to provide comfortable ride.

Although in the above embodiments, the engine 1 illustrated is an outboard engine, it may be an inboard engine. In addition, although it has been described that an operating state of the engine 1 in which the engine 1 is subjected to great variations in the intake air pressure is a trolling state, the present invention is likewise applicable to cases in which there are great variations in the intake air pressure other than during trolling.

What is claimed is:

1. A control apparatus for a marine engine having a transmission comprising:

a rotational speed sensor for sensing the number of revolutions per minute of the engine and generating a corresponding output signal;

a gear position sensor for sensing a gear position of the transmission and generating a corresponding output signal;

an air/fuel ratio sensor for sensing an air/fuel ratio of a mixture supplied to the engine and generating a corresponding output signal;

a controller connected to receive the output signals from said rotational speed sensor, said gear position sensor and said air/fuel ratio sensor for generating a drive signal which controls an engine control parameter, based on at least the number of revolutions per minute of the engine, the gear position and the air/fuel ratio as sensed by said sensors; and actuator means connected to receive the drive signal from said controller for controlling the engine control parameter based on said drive signal;

said controller comprising:

a trolling determinor for determining, based on the number of revolutions per minute of the engine and the gear position, whether the engine is trolling; and power control means for controlling said actuator means such that output power of the engine is made to be at a constant value when the engine is trolling.

2. A control apparatus according to claim 1, wherein said controller is operable to control said actuator means such that the air/fuel ratio of the mixture is made to be substantially at a stoichiometric value when the engine is not trolling, but the amount of fuel supply to the engine is determined on the basis of an engine load and the rotational speed of the engine so as to make the engine output power at the constant value when the engine is trolling.

3. A control apparatus according to claim 1, wherein said trolling determinor determines engine trolling when the number of revolutions per minute of the engine is less than a predetermined value and when the transmission is in a coupled state.

4. A control apparatus for a marine engine having a transmission comprising:

a rotational speed sensor for sensing the number of revolutions per minute of the engine and generating a corresponding output signal;

a gear position sensor for sensing a gear position of the transmission and generating a corresponding output signal;

a pressure sensor for sensing an intake air pressure in an intake manifold of the engine and generating a corresponding output signal;

a controller connected to receive the output signals from said rotational speed sensor, said gear position sensor and said pressure sensor for generating a drive signal which controls engine control parameters, based on at least the number of revolutions per minute of the engine, the gear position and the intake air pressure as sensed by said sensors;

actuator means connected to receive the drive signal from said controller for controlling the engine control parameters based on said drive signal;

said controller comprising:

a trolling determinor for determining, based on the number of revolutions per minute of the engine and the gear position, whether the engine is trolling; and pressure stabilizing means for controlling said actuator means in such a manner as to increase output power of the engine in accordance with the increasing intake air pressure, said pressure stabilizing means being operable to control said actuator means based on an averaged value of the intake air pressure which is obtained by using a greater averaging coefficient when the engine is trolling than in other operating states of the engine so as to reduce a variation in the averaged intake air pressure.

5. A control apparatus according to claim 4, wherein the averaging of the intake air pressure sensed by said pressure sensor is performed as follows:

$$P_R = P/m + P_{R-1}(m-1)/m$$

where P is a current intake air pressure sensed by said pressure sensor; P. is a current average of the intake air pressure; $P_{R-1}$=a previous average of the intake air pressure; and m is the averaging coefficient.

6. A control apparatus according to claim 4, wherein said trolling determinor determines engine trolling when the number of revolutions per minutes of the engine is less than a predetermined value and when the transmission is in a coupled state.

* * * * *